INVENTOR
S. Y. TONG
BY R C Lipton
ATTORNEY

FIG. 3

| ALPHABETIC SYMBOLS | BINARY REPRESENTATION AS GENERATED BY $X^3+X+1=0$ | | |
|---|---|---|---|
| 0 | 000 | | |
| $\alpha^0=1$ | 100 | | |
| $\alpha^1$ | 010 | | |
| $\alpha^2$ | 001 | | |
| $\alpha^3$ | 110 | = | $1+\alpha$ |
| $\alpha^4$ | 011 | = | $\alpha+\alpha^2$ |
| $\alpha^5$ | 111 | = | $1+\alpha+\alpha^2$ |
| $\alpha^6$ | 101 | = | $1+\alpha^2$ |

FIG. 4

ADDITION TABLE

| | 0 | $\alpha^0$ | $\alpha^1$ | $\alpha^2$ | $\alpha^3$ | $\alpha^4$ | $\alpha^5$ | $\alpha^6$ |
|---|---|---|---|---|---|---|---|---|
| 0 | 0 | $\alpha^0$ | $\alpha^1$ | $\alpha^2$ | $\alpha^3$ | $\alpha^4$ | $\alpha^5$ | $\alpha^6$ |
| $\alpha^0$ | | 0 | $\alpha^3$ | $\alpha^6$ | $\alpha^6$ | $\alpha^5$ | $\alpha^4$ | $\alpha^2$ |
| $\alpha^1$ | | | 0 | $\alpha^4$ | $\alpha^0$ | $\alpha^2$ | $\alpha^6$ | $\alpha^5$ |
| $\alpha^2$ | | | | 0 | $\alpha^5$ | $\alpha$ | $\alpha^3$ | $\alpha^0$ |
| $\alpha^3$ | | | | | 0 | $\alpha^6$ | $\alpha^2$ | $\alpha^4$ |
| $\alpha^4$ | | | | | | 0 | $\alpha^0$ | $\alpha^3$ |
| $\alpha^5$ | | | | | | | 0 | $\alpha$ |
| $\alpha^6$ | | | | | | | | 0 |

FIG. 5

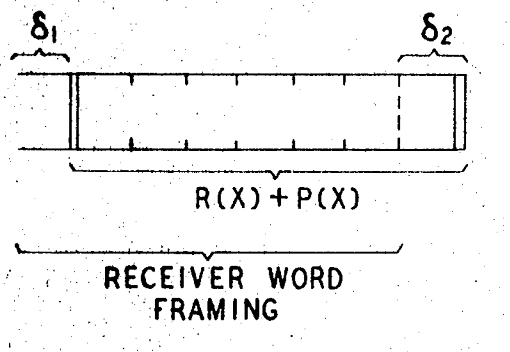

United States Patent Office
3,550,082
Patented Dec. 22, 1970

3,550,082
AUTOMATIC SYNCHRONIZATION RECOVERY TECHNIQUES FOR NONBINARY CYCLIC CODES

Shih Y. Tong, Middletown, N.J., assignor to Bell Telephone Laboratories, Incorporated, Murray Hill, N.J., a corporation of New York Continuation-in-part of application Ser. No. 535,164, Mar. 17, 1966. This application Mar. 8, 1968, Ser. No. 711,543
Int. Cl. G08c *25/00;* H04l *1/10*
U.S. Cl. 340—146.1 28 Claims

ABSTRACT OF THE DISCLOSURE

A method and system are disclosed for providing automatic synchronization recovery in data systems utilizing $q$-nary error-correcting cyclic codes where $q$ represents the number of symbols in the code alphabet and is $\geqq 3$. In particular, each $q$-nary data word to be transmitted from a transmitting station to a receiving station is modified by the addition of a predetermined sequence. In one embodiment, this sequence includes an alphabetic symbol $a$, where $a$ is any symbol of the code alphabet $\neq 0$. Each modified word is then transmitted to the receiving station where the predetermined sequence is subtracted from each received word. The resultant is then processed to obtain an error-pattern word. Presence of the symbol $a$ in certain specific positions of the error pattern word indicates the occurrence of certain synchronization gains or losses. Word framing is then adjusted accordingly.

CROSS REFERENCES TO RELATED APPLICATIONS

This application is a continuation-in-part of copending application Ser. No. 535,164 filed Mar. 17, 1966 and now Pat. No. 3,466,601, issued Sept 9, 1969.

BACKGROUND OF THE INVENTION

(1) Field of the invention

This invention relates to data transmission systems and more particularly to automatic synchronization recovery techniques embodied in transmitting and receiving equipment in such systems.

(2) Description of the prior art

The need for accurate transmission and processing of digital data is well recognized in such areas as telegraphy, telephony, and computer and automation technology. Such digital data is often represented or coded into sequences of signals (hereafter referred to as symbols or characters). Each position in any sequence or code word consists of one symbol of the code alphabet, the different code word permutations of symbols representing different items of information. Of course, longer messages can be represented by combinations of code words just as the symbols of a language alphabet are used to construct words and then words used to construct sentences. The most commonly used coding alphabet is the binary alphabet consisting of the symbols "0" and "1." An example of another alphabet is the ternary alphabet consisting of the symbols "0," "1," and "2."

Methods of improving the accuracy of transmission of information range from single error detection schemes requiring the appending of a single check symbol to each code word to be transmitted to more elaborate schemes of error correction requiring the deliberate choice of special code words to represent the information or data. Examples of the latter are cyclic codes as described in "Error Correcting Codes" by W. W. Peterson, the MIT Press and John Wiley and Sons, 1961.

Each word in a cyclic code is a cyclic permutation of some other word which is also in the code. Because of this characteristic, a loss of synchronization in a data system employing cyclic codes may not be detected by the receiver, in which case received words would be erroneously interpreted as being correct. Even if such loss of synchronization resulted in the receiver detecting an error, it may interpret such error as additive error (i.e., that caused by channel noise) rather than as error arising from a loss of synchronization (synchronization slippage). The need for detecting loss of and restoring synchronization is present in nearly all digital data transmission systems.

A common method of providing transmitter and receiver synchronization is to separate each transmitted code word, the separation may comprise some distinctive sequence of symbols not used for message information or may comprise some distinctive signal different from those signals used to represent the symbols of the coding alphabet. The disadvantage of the first scheme, of course, is that the additional redundancy provided for synchronization reduces the overall rate of transmission. With the second scheme the requirement of a special signal for framing increases the bandwidth requirements of the communication channel. In either case, considerable expense may be attached for providing synchronization.

Another synchronization technique is to provide the data transmission system with conventional error detection capabilities and presume that when the number of detected errors exceeds some predetermined threshold value, the system is out of synchronization. One such scheme is described in Pat. No. 3,159,811, issued Dec. 1, 1964 to D. B. James and W. T. Wintringham. Correction after detection of synchronization slippage in systems using the above technique generally requires stopping and restarting the whole system with a resultant loss of time and perhaps even data. In addition, there is no way to distinguish between additive errors and synchronization errors. For example, if the communication channel were subject to excessive noise, this might be falsely interpreted as a synchronization slippage. Since the two types of errors cannot be distinguished, certainly the direction of synchronization slippage cannot be determined (i.e., whether a synchronization gain or loss has occurred). Finally, if the synchronization slippage is only a few symbols, and the transmitted data is of such a nature that the error threshold is not exceeded, the received sequences would again be falsely interpreted.

SUMMARY OF THE INVENTION

In view of the above described prior art systems, it is an object of the present invention to provide a data transmission system capable of detecting and distinguishing additive errors due to channel noise and errors due to loss of synchronization between the transmitting and receiving equipment. The transmission system utilizes a $q$-nary cyclic code where $q$ represents the number of symbols in the coding alphabet and in particular $$q=p^n \geq 3$$

$p$ being a prime number and $n=1, 2, \ldots$.

Another object of this invention is to provide for detceting the direction of the synchronization slippage in such a data transmission system, i.e., for detecting whether the receiver has gained or lost symbols during the course of data transmission.

A further object of this invention is to enable the recovery of synchronization with the requirement of little or no additional redundancy and without requiring transmission of a unique framing signal.

A still further object of the present invention is to enable the automatic recovery of synchronization for $q$- nary error-correcting cyclic codes in an efficient and economical manner.

These and other objects of the present invention are illustrated in a specific embodiment in which information signals to be transmitted from one location to another are first encoded into a $q$-nary error-correcting cyclic code where, as noted earlier, $q=p^n\geq 3$, $p$ being a prime number and $n=1, 2 \ldots$ Each resultant word contains $k$ information symbols and $(n-k)$ parity check symbols. A specific preselected word is then combined with each code word to be transmitted by adding (addition modulo $p$) the first symbol of the $n$-symbol code word to the first symbol of the preselected word, the second symbol of the code word to the second symbol of the preselected word, etc. The resulting word is then transmitted over the data channel to the receiving terminal where another preselected word (which in most cases is the same word as that added before transmission) is subtracted from the word received. The word obtained from subtraction is then divided by what is called the generator polynomial of the particular cyclic code being used. (The generator polynomial is simply a word used in the encoding and decoding of cyclic codes. This will be explained in more detail later.) From this division, the remainder or so-called syndrome is obtained, which is in turn used to generate an error pattern. Certain error patterns indicate the occurrence of certain synchronization gains or losses. The error pattern word is then supplied to associated circuitry in the receiver and appropriate steps are taken to correct whichever type error has been detected, i.e., synchronization error or additive error.

BRIEF DESCRIPTION OF THE DRAWINGS

A complete understanding of the present invention and of the above and other objects and advantages thereof, may be gained from a consideration of the following detailed description of specific illustrative embodiments presented hereinbelow in connection with the accompanying drawings described as follows:

FIG. 3 shows an exemplary eight-symbol coding alphabet and binary representations of the eight symbols;

FIG. 4 shows in addition table for the alphabet of FIG. 3;

FIG. 5 gives a symbolic representation of a one-symbol synchronization loss.

DETAILED DESCRIPTION

Figure 1:
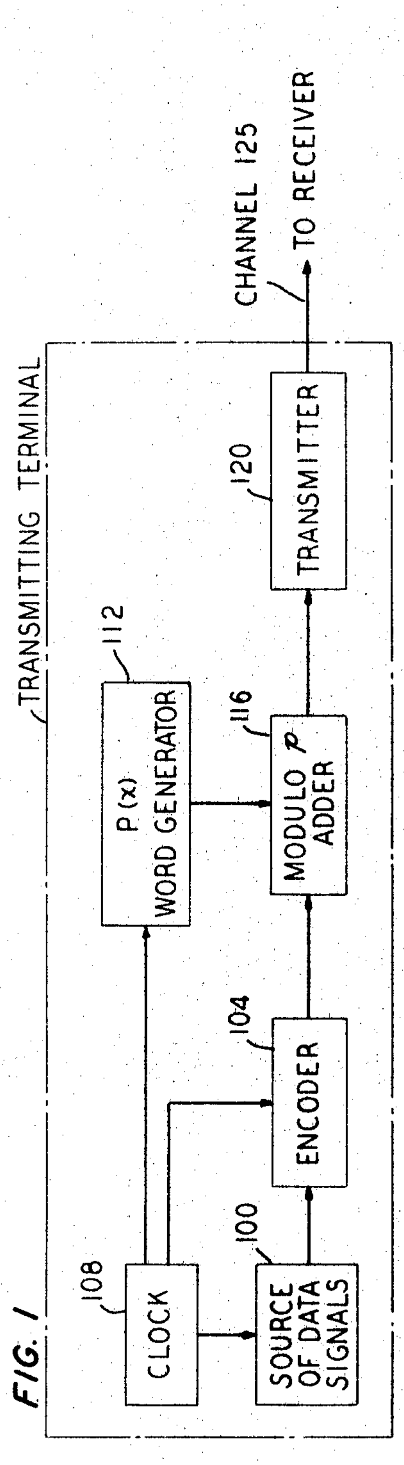
FIGS. 1 and 2 show, respectively, transmitting and receiving terminals which together comprise a generalized illustrative error-correcting synchronization recovery system made in accordance with the principles of the present invention.

The transmitting terminal shown in FIG. 1 includes a source 100 for supplying $q$-nary data signals in which each $k$-symbol sequence comprises a data word. The various combinations of the $k$-symbols of course represent message information which is to be transmitted to an associated receiving terminal. The $k$-symbol data words are delivered to an encoder 104 which generates $n-k$ parity symbols from the data words according to a specific cyclic encoding strategy. The $k$-symbol data word plus the $n-k$ parity symbols comprise an $n$-symbol cyclic code word. Methods of encoding data into cyclic code words are dicussed in the previously cited Peterson text.

Before proceeding further, it will be helpful to briefly discuss the algebraic representaion of codes and coding proceses. In general, a $k$-symbol information sequence may be represented by a polynomial of the form, $$A(x)=a_0+a_1x+ \ldots +a_{k-1}x^{k-1} \quad (1)$$

in which each of the coefficients $a_0, a_1 \ldots a_{k-1}$ represents some symbol of the coding alphabet. For example, the ternary sequence 102102 may be represented by the polynomial $1+2^2+x^3+2x^5$. With such representation, the information symbols corresponding to the high order coefficients are thought of as being transmitted first.

A cyclic code is generally defined in terms of a generator polynomial $G(x)$ of degree $n-k$. The $n-k$ parity symbols discussed above are obtained preferably by dividing the $k$-symbol data word having $n-k$ "0's" appended to it [represented by $x^{n-k}$ $A(x)$] by the generator polynomial $G(x)$. The remainder $R(x)$ represents the parity sequence subtracted from the data word $x^{n-k}$ $A(x)$.

A code word to be transmitted can thus be represented by $$F(x)=x^{n-k}A(x)-R(x) \quad (2)$$

wherein the substraction is performed modulo $p$.

It should be noted here that although codes having alphabets consisting of $q$ symbols, where $q\geq 3$ have been discussed, implementation of such codes in a data system may be done by encoding the symbols in turn into sequences of binary symbols, i.e., in sequences of "0's" or "1's." Thus, although each code word of a particular code used may consist of $k$ information symbols and $n-k$ check symbols, each of these symbols, in turn, may be represented by a sequence of binary digits or bits. One reason for using $q$-nary symbols in the first place is for multilevel data transmission, i.e., where the number of channel symbols is greater than two.

To logically perform the above described encoding operations, the encoder 104 includes a shift register having a certain number of stages with appropriate feedback connections as discussed in the aforecited Peterson text. After $k$ information symbols have been shifted into such an encoder and through to the modulo-$p$ adder 116, the feedback connection of the encoder is disabled and the contents of the shift register after changing the signs of each of the symbols are delivered to the modulo $p$ adder 116. (If $p=2$, no change of sign is required, since addition and subtraction are equivalent in the binary case.)

Application of the $n$-symbol code word by the encoder 104 to the adder 116 is done in response to signals or pulses from a clock 108. Each symbol of the code word is thereupon added (addition modulo $p$) to a corresponding symbol of a word $P(x)$ generated by a word generator 112. The word $P(x)$ is chosen so that error patterns obtained in the decoding process for synchronization slippage will be different from error patterns obtained for additive error. This will be explained in greater detail later and specific choices of the word $P(x)$ which satisfy this criterion for particular cyclic codes will be given.

The modified code word resulting from modulo-$p$ addition of the fixed word $P(x)$ and the code word $F(x)$ is then applied to a transmitter 120 for transmission over a communication channel 125. As will be shown in later specific applications of the invention, this word may or may not be further modified by appending "0's" to each end of the word. The specific characteristics of the code utilized will determine whether or not "0's" are to be appended and if so how many are required. (The term "0" used here means that symbol of the coding alphabet having zero value.)

Upon the receipt of the modified code word (which may include errors caused by channel noise), a receiver 200 (FIG. 2) signals a clock 204 that the received word is about to be applied to a modulo-$p$ subtractor 208. The clock, in turn, signals a word generator 212 to apply the word $P(x)$ (or a word equivalent to $P(x)$ which is sufficient to yield the desired results explained below) to the modulo-$p$ subtractor 208. Each symbol of the word $P(x)$ is then subtracted (subtraction modulo $p$) from a corresponding symbol of the received word. If no additive error (channel noise) or synchronization slippage has occurred, the subtraction performed at the receiving terminal restores the modified code word to its previously unmodified condition, that is, to the cyclic code word $$F(x)=x^{n-k}A(x)-R(x)$$

The word obtained from subtraction is then transferred to a buffer register 216 where it is temporarily stored before further processing. When a syndrome generator 232 has finished its operation on the previously received word, the word of present concern is applied by the buffer register 216 to the syndrome generator 232. The syndrome generator 232 then performs certain logical operations upon the word to obtain what is called a syndrome (a digital sequence or word). This syndrome may be obtained by either dividing the applied word by the generator polynomial $G(x)$, in which case the remainder is the desired syndrome, or by generating new parity symbols from the data portion of the applied word and subtracting the new parity sequence from the parity sequence of the word being processed, the resulting difference being the required syndrome.

The syndrome is then delivered to decoding logic 224 where it is processed to obtain an error pattern word $E(x)$ indicating the location and value of errors in the received word. (Error value is defined as that value by which an erroneously received symbol differs from the correct version of the symbol.) The occurrence of certain error patterns will indicate that a synchronization slippage has occurred. The pattern will also indicate whether the slippage is a synchronization loss or gain.

Obtaining the error pattern $E(x)$ can be accomplished in either of two ways. The more straightforward method is to compare each syndrome received from the syndrome generator 232 with each syndrome of a list stored in a permanent memory. Each syndrome in memory would be associated with its corresponding error pattern such that when a match occurred between the received syndrome and a syndrome in memory, the associated error pattern could be read out. If the error-correcting ability of the code is not exceeded, each syndrome will uniquely identify one specific combination of errors (refer to W. W. Peterson's text, chapter 9). Also, additive errors will not be mistaken for synchronization errors and vice versa. The above method is impractical for syndromes containing many symbols since the amount of permanent memory required would be prohibitively expensive. A more detailed explanation of possible arrangements for locating error positions by "matching" as discussed above is discussed in a copending application of R. N. Watts, Ser. No. 439,650, filed Mar. 15, 1965 and now Pat. No. 3,411,135, issued Nov. 12, 1968.

The error patterns $E(x)$ can also be obtained by performing certain logical calculations on the syndrome. The previously cited Peterson text describes such calculations in detail for the binary case on pages 167 through 175. Extension to the nonbinary case is considered straightforward. In addition, the copending application of H. O. Burton, Ser. No. 429,386, filed Feb. 1, 1965 and now Pat. No. 3,389,375, issued June 18, 1968, describes a particular method of obtaining the error patterns $E(x)$ from logical calculations. After obtaining the error pattern, one of several things might be done. One possibility would be to commence the additive-error-correcting procedure (to be explained) before or during the determination of the synchronization condition of the system. If an out-of-synchronization condition were detected, then the data system user could be signaled to ignore the previously "additive-error" corrected word, since the word would not have been properly corrected. Another possibility would be to first determine the synchronization condition of the system and if no out-of-sync condition were present, commence the additive-error-correcting procedure, while if an out-of-sync condition were present, simply not perform additive-error correction until synchronization was restored. Since the choice of either of the above (or any other) procedures is not significant to the invention, no further reference to them will be made. Additive-error correction and synchronization slippage correction will be explained assuming that some procedure although not specified has been chosen.

In correcting synchronization slippage, it is generally desirable to wait for the occurrence of two or more synchronization slippage patterns before correcting the synchronization to ensure that a synchronization slippage did, in fact, occur. Even though an excessive number of additive errors could cause the generation of a synchronization slippage pattern, it is highly improbable that additive error would cause the generation of two or more consecutive identical synchronization slippage patterns. Thus, by waiting for the occurrence of two or more synchronization slippage patterns, the chance that the receiving terminal will misinterpret additive errors or a synchronization slippage is greatly reduced.

The error patterns are $n$ symbols in length and contain alphabetical symbols of value other than zero in each position corresponding to a position in the received code word which was received in error. The value of the symbols in these positions is equal to the error value of the errors in the corresponding positions in the received word. Additive errors are corrected by simultaneously applying the error pattern of a received code word and the word stored in the buffer register 216 to a modulo-$p$ subtractor 220. As an erroneous symbol in the data word is applied from the buffer register 216 to the subtractor 220, a correction signal having a value equal to the error value of the erroneous symbol is applied by the decoding logic 224 and subtractor from the erroneous symbol, thereby effecting a correction of the symbol.

The error pattern $E(x)$ is in some cases also transmitted to a synchronization loss detector 236 for processing to determine if a synchronizational loss or gain has occurred. In other cases, information directly from the syndrome generator 232 may be utilized to determine the synchronization condition of the system and for this reason the lead from the generator 232 to the synchronization loss detector 236 is shown. After such determination, the synchronization loss detector 236 signals the word framing generator 240 to either advance or backset the framing. Although not illustrated in FIG. 1 or 2, the data system may be designed to request the retransmission upon detection of an out-of-synchronization condition provided, of course, that a reverse channel is available. In this case, the correction of framing would be performed on the retransmitted code word. If a reverse channel is not available, then the receiving terminal is designed to either correct the synchronization on subsequently-received code words or correct synchronization on the code words already received and in storage. The method chosen is dependent on the available facilities and the desires of the data system user. Illustratively, the word framing generator 240 includes a counting circuit which simply counts an appropriate number of symbol times between the generation of word framing signals. Upon receipt of a "backset" signal, the counting circuit counts *extra* symbol times before causing word framing signals to be generated and applied to the apparatus shown in FIG. 2. In response to the "corrected" word framing signal, the $P(x)$ word generator 212 applies the word $P(x)$ to the modulo-$p$ subtractor 208 a certain number of symbol times later. The buffer register 216 and syndrome generator 232, also in response to the "corrected" word framing signal, "backset" their respective operations on received data. An "advance" in word framing is accomplished in similar fashion with the counting circuit in the generator 240 being directed to count a *fewer* number of symbol times before causing the generation of word framing signals.

For some codes, it is possible to detect the specific amount of synchronization slippage while for others it is only possible to detect that either a synchronization loss or gain has occurred. Examples for particular codes will now be discussed in detail.

CYCLIC CODES USED TO CORRECT $$t=\left[\frac{d-1}{2}\right]$$

ERRORS

If—

(1) code $C_1$, generated by $G_2(x)$, has minimum distance $d_1$ (distance being defined as the number of symbol positions in which code words differ.)

(2) Code $C_2$, generated by $G_2(x)$, has minimum distance $d_2$, (3) $G_2(x)$ divides $G_1(x)$ evenly, (4) $R(1)=G_1(x)/G_2(x)|_{x=1}\neq 0$, and (5) $d_2>[(d_1+1)/2]$ where [*] represents the largest integer just less than or equal to *, then code $C_1$ can be utilized to provide synchronization recovery of at least one symbol. If the above five conditions are satisfied, then the error patterns obtainable when a synchronization loss or gain of one symbol occurs will be distinguishable from each other as well as from all additive error patterns resulting from $$\left[\frac{d_1-1}{2}\right]$$

or less errors.

Possible choices of $P(x)$ for this scheme are $$P(x)=\left\{\frac{k(x)-k(1)}{x-1}\right\}$$

where $k(x)$ is a polynominal in $C_2$ but not in $C_1$. Choosing $k(x)=G_2(x)$ will always give a valid $P(x)$. The notation {*} represents either the syndrome of * (syndromes having been discussed earlier) or any element which will give the same syndrome when divided by the generator polynominal of the code. If only one meaning is intended, the particular meaning intended will be clear from the context.

Synchronization recovery is implemented by adding $P(x)$ to each code word to be transmitted at the transmitting terminal and subtracting $P(x)$ or an equivalent word from each received word at the receiving terminal. If the syndrome of the received word is $\{k(x)+\delta\}$, where $\delta$ is any symbol of the coding alphabet, a synchronization loss is indicated. If the syndrome is $\{-x^{n-1}[k(x)+\delta]\}$, a synchronization gain is indicated. Detection of synchronization slippage can be accomplished either by comparing syndromes of the received words with the syndromes known to occur when a sync loss or gain occurs or by logically processing the syndromes of the received words utilizing special circuits such as that shown in FIG. 7 to be discussed hereafter.

An example of a code meeting requirements (1) through (5) set forth above and capable of correcting a single-symbol synchronization slippage is the Reed-Solomon (7, 3) double-error-correcting code defined over $GF(2^3)$ [meaning the code has eight elements or alphabetic symbols] and having a minimum distance of five between the code words, i.e., $d_1=5$. The eight elements or alphabetic symbols of this code may be represented by the symbols 0, $\alpha^0$, $\alpha^1$ . . . $\alpha^6$, where $\alpha^0=1$ as is the customary notation. These symbols, in turn, may each be represented by sequences of binary digits as shown in FIG. 3. Although such binary representation is not required in the present example, it does aid in understanding the arithmetic (addition, subtraction, etc.) used in operating upon the alphabetic symbols 0, $\alpha^0$, $\alpha^1$ . . . $\alpha^6$.

Further, such representation will be utilized in describing one illustrative embodiment of applicant's system. Rules for adding (and thus subtracting) the alphabetic symbols are indicated by the addition table of FIG. 4. Note in this case since $p=2$, subtraction and addition are equivalent.

An appropriate choice of a generator polynomial $G_1(x)$ satisfying the above defined conditions is $$G_1(x)=(x-\alpha)(x-\alpha^2)(x-\alpha^3)(x-\alpha^4)$$
$$=\alpha^3-\alpha x+x^2-\alpha^3x^3+x^4$$

which generates the (7, 3) Reed-Solomon code given above having a minimum distance of $d_1=5$. An appropriate choice of $G_2(x)$ satisfying the above requirements is $$G_2(x)=(x-\alpha)(x-\alpha^2)(x-\alpha^3)=\alpha^6+\alpha x-\alpha^6x^2+x^3$$

which generates a Reed-Solomon code $C_2$ having a minimum distance of $d_2=4$. Conditions (3) and (4), given above are satisfied since $$R(1)=\left.\frac{G_1(x)}{G_2(x)}\right|_{x=1}=x-\alpha^3\Big|_{x=1}=1-\alpha^3\neq 0$$

Condition (5) likewise is satisfied since $$4=d_2>\frac{d_1+1}{2}=\frac{6}{2}=3$$

In accordance with the above rules, $P(x)$ is chosen to be $$P(x)=\left\{\frac{G_2(x)-G_2(1)}{x-1}\right\}=\alpha^4+\alpha^2x+x^2$$

The error pattern which will be obtained at the receiving terminal of a system utilizing the above code when a synchronization loss of one symbol has occurred may be determined as follows. Given that the code word to be transmitted is a seven symbol sequence $R(x)$, the sequence ultimately transmitted after adding $P(x)$ is $R(x)+P(x)$. The received sequence as seen by the receiver after a one-symbol synchronization loss has occurred can be represented as $$x[R(x)+P(x)]+\delta_1-x^7\delta_2 \quad (3)$$

where $\delta_1$ represents the symbol of the next data word included in the word framing and $\delta_2$ represents the highest order symbol of the transmitted sequence not included in the word framing. This is illustrated in FIG. 5.

After subtracting $P(x)$ from the sequence represented by Equation 3, the following is obtained $$L(x)=x[R(x)+P(x)]+\delta_1-x^7\delta_2-P(x)$$
$$L(x)=(x-1)P(x)+xR(x)+\delta_1=x^7\delta_2$$

Since the (7, 3) Reed-Solomon code is cyclic over the ring $x^7-1=0$, then $x^7=1$. Thus in the above equation for $L(x)$, $x^7\delta_2$ reduces to $\delta_2$ so that $$L(x)=(x-1)P(x)+xR(x)+\delta_1-\delta_2$$

or $$L(x)=(x-1)P(x)+xR(x)+\delta_3$$

where $\delta_3=\delta_1-\delta_2$. The sequence $L(x)$ is then decoded by dividing by $G_1(x)$ to obtain the following remainder or error pattern:

$$E_1(x)=(x-1)P(x)+\delta_3$$

Since $xR(x)$ is a code word of the cyclic code $C_1$, it is evenly divisible by $G_1(x)$ and hence drops out of the expression. This pattern represents the pattern obtained when a synchronization loss occurs. Substituting $$P(x)=\alpha^4+\alpha^2x+x^2$$

the following is obtained:

$$E_1(x)=(x-1)(\alpha^4+\alpha^2x+x^2)+\delta_3$$
$$=\delta_4+\alpha x+\alpha^6x^2+x^3 \quad (4)$$

where $\delta_4=\delta_3-\alpha^4$. Derivation of the above expression for $E_1(x)$ requires application of the rules for adding and subtracting the alphabetic symbols 0, $\alpha^0$, $\alpha^1$ . . . $\alpha^6$ which are given in FIG. 4. Note that the synchronization loss pattern defined earlier was $$k(x)+\delta=G_2(x)+\delta=\alpha^6+\delta+\alpha x-\alpha^6x^2+x^3=\delta+\alpha x-\alpha^6x^2+x^3$$

since $\delta$ represents any symbol of the coding alphabet. Since, for $p=2$, subtraction is equivalent to addition, the above pattern becomes $\delta+\alpha x+\alpha^6x^2+x^3$ which is precisely $E_1(x)$ as required.

Using similar reasoning as above, it can be shown that the error pattern obtained when a synchronization *gain* occurs is $$E_2(x)=(x^{-1}-1)P(x)+\delta x^{-1}=\delta_5x^{-1}+\alpha+\alpha^6x+x^2 \quad (5)$$

Multiplying $E_2(x)$ by $x$ gives $$\delta_5+\alpha x+\alpha^6x^2+x^3 \quad (6)$$

which is the same pattern as $E_1(x)$. This characteristic of $E_2(x)$ will be utilized later in an example illustrating the detection of synchronization gain.

Now assume that the information sequence $\alpha^4\alpha\alpha^2$ represented by the polynomial $I(x)=\alpha^4+\alpha x+\alpha^2x^2$ is to be transmitted. The parity or check symbols for this sequence are obtained by dividing $x^4I(x)$ by $G_1(x)$, with the remainder thereof representing the desired check symbols. Thus $$\frac{x^4I(x)}{G_1(x)}=\frac{\alpha^4x^4+\alpha x^5+\alpha^2x^6}{\alpha^3-\alpha x+x^2-\alpha^2x^3+x^4}$$
$$=1+\alpha^3x+\alpha^5x^3 \quad \text{remainder}$$

which corresponds to the sequence $1\alpha^30\alpha^4$. The code word thus obtained is $$\underbrace{1\,\alpha^3\,0\,\alpha^5}_{\text{parity symbols}}\quad\underbrace{\alpha^4\,\alpha\,\alpha^2}_{\text{information symbols}}$$

Adding $P(x)=\alpha^4+\alpha^2x+x^2$ to this sequence gives $$\begin{array}{l} 1\ \alpha^3\ 0\ \alpha^5\ \alpha^4\ \alpha\ \alpha^2\text{—code word}\\ \underline{\alpha^4\ \alpha^2\ 1\ 0\ 0\ 0\ 0}\text{—}P(x)\\ \alpha^5\ \alpha^5\ 1\ \alpha^5\ \alpha^4\ \alpha\ \alpha^2\text{—modified code word}\end{array}$$

the modified code word being the sequence transmitted.

Now assume that a single-symbol synchronization loss occurs as indicated by the arrows in the diagram below (the commas represent the true framing).

$$\alpha^6,\ \alpha^5\ \alpha^5\ 1\ \alpha^5\ \alpha^4\ \alpha\ \alpha^2, \quad \xrightarrow{\text{message flow}}$$
↑ receiver framing ↑

At the receiving terminal, $P(x)$ would be subtracted from the word shown between the arrows or $$\begin{array}{l} \alpha^6\ \ \alpha^5\ \ \alpha^5\ 1\ \alpha^5\ \alpha^4\ \alpha\text{—received word}\\ \underline{-\alpha^4\ -\alpha^2\ -1\ 0\ 0\ 0\ 0}\text{—}P(x)\\ \alpha^3\ \ \alpha^3\ \ \alpha^4\ 1\ \alpha^5\ \alpha^4\ \alpha\text{—}M_1(x)\end{array}$$

The syndrome of the message $M_1(x)$, which is the remainder of $M_1(x)/G_1(x)$, is then obtained $$S_1=\left\{\frac{M_1(x)}{G_1(x)}\right\}=\left\{\frac{\alpha^3+\alpha^3x+\alpha^4x^2+x^3+\alpha^5x^4+\alpha^4x^5+\alpha x}{\alpha^3-\alpha x+x^2-\alpha^3x^3+x^4}\right\}$$
$$=\alpha^5+\alpha x+\alpha^6x^2+x^3 \text{ modulo } G_1(x)$$

This syndrome or error pattern is precisely the error pattern $E_1(x)$ (Equation 4) derived for a one-symbol synchronization loss. In this manner, a one-symbol synchronization loss in a system utilizing the (7, 3) Reed-Solomon code *may* be detected.

Assume now that the same message as above is transmitted but that a one-symbol synchronization gain occurs. The message seen by the receiver would then be as indicated below $$,\ \alpha^5\ \alpha^5\ 1\ \alpha^5\ \alpha^4\ \alpha\ \alpha^2,\ \alpha^3 \quad \xrightarrow{\text{message flow}}$$
↑ receiver framing ↑

As before, $P(x)$ would be subtracted from the word shown between the arrows or, $$\begin{array}{l} \alpha^5\ \ 1\ \ \alpha^5\ \alpha^4\ \alpha\ \alpha^2\ \alpha^3\text{—received word}\\ \underline{-\alpha^4\ -\alpha^2\ -1\ 0\ 0\ 0\ 0}\text{—}P(x)\\ \alpha^0\ \ \alpha^6\ \ \alpha^4\ \alpha^4\ \alpha\ \alpha^2\ \alpha^3\text{—}M_2(x)\end{array}$$

The syndrome or error pattern of $M_2(x)$ is $$S_2=\left\{\frac{M_2(x)}{G_1(x)}\right\}=\left\{\frac{\alpha^0+\alpha^6x+\alpha^4x^2+\alpha^4x^3+\alpha x^4+\alpha^2x^5+\alpha^3x^6}{\alpha^3-\alpha x+x^2-\alpha^3x^3+x^4}\right\}$$
$$=\alpha^3+\alpha^6x^2+\alpha^6x^3 \text{ modulo } G_1(x)$$

Multiplying $S_2$ by $x$ gives $$xS_2=\alpha^3x+\alpha^6x^3+\alpha^6x^4 \text{ modulo } G_1(x)$$

Recall that $$G_1(x)=\alpha^3-\alpha x+x^2-\alpha^3x^3+x^4=0 \text{ modulo } G_1(x)$$

hence $$xS_2=\alpha^3x+\alpha^6x^3+\alpha^6(\alpha^3x^3-x^2+\alpha x-\alpha^3)$$
$$=\alpha^2+\alpha x+\alpha^6x^2+x^3 \text{ modulo } G_1(x)$$

which is the same as the synchronization loss pattern. It was shown earlier that multiplying the synchronization gain pattern $E_2(x)$ (Equation 5) by $x$ gave the synchronization loss pattern $E_1(x)$ (Equation 4). Thus the above expression for $xS_2$ indicates that a one-symbol synchronization gain has occurred as required.

Figure 6:
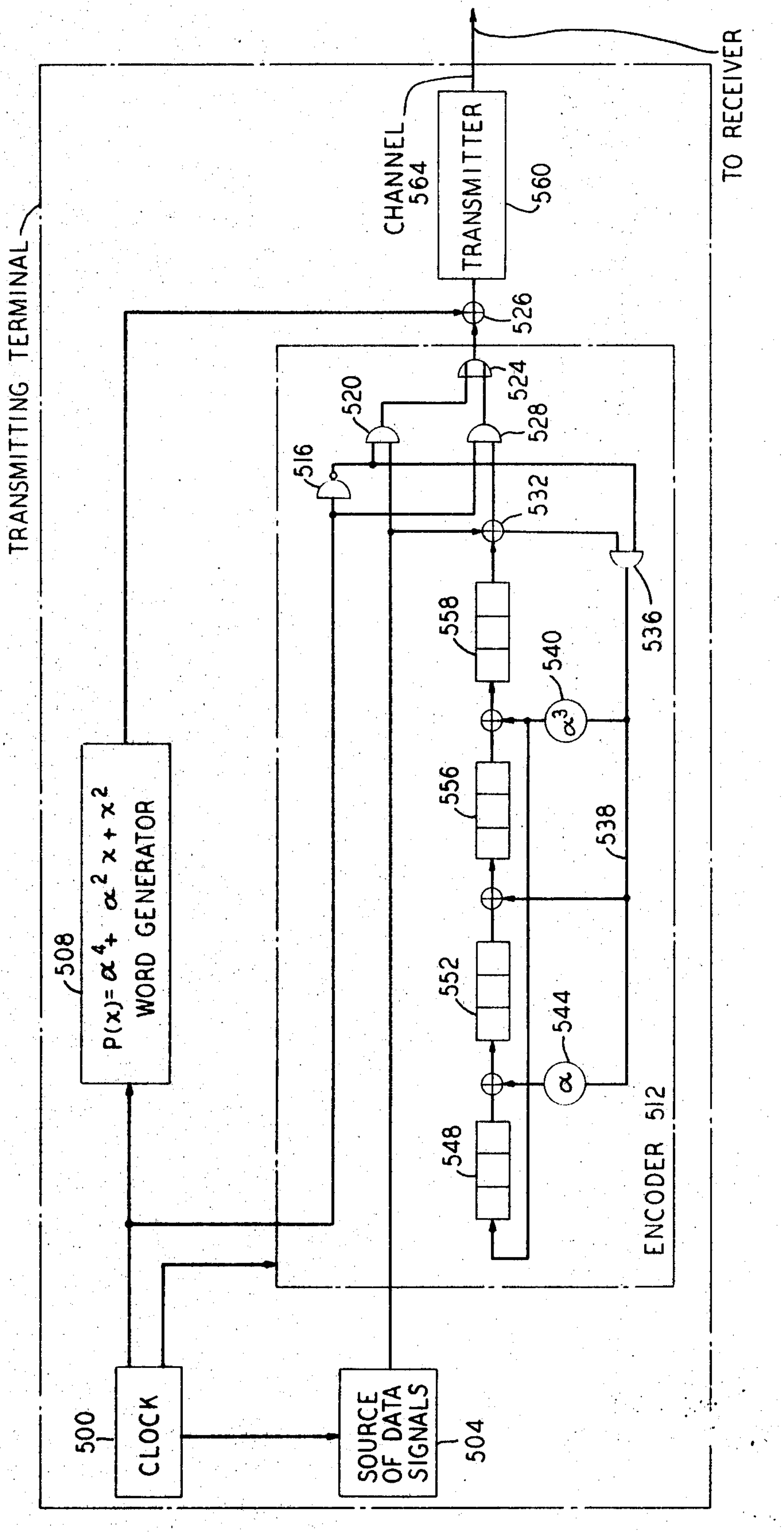
FIGS. 6 and 7 show, respectively, transmitting and receiving terminals comprising a specific illustrative double-error-correcting synchronization recovery system employing the well known (7, 3) Reed-Solomon code defined over GF $(2^3)$ and capable of one-symbol synchronization slippage correction.
Figure 7:
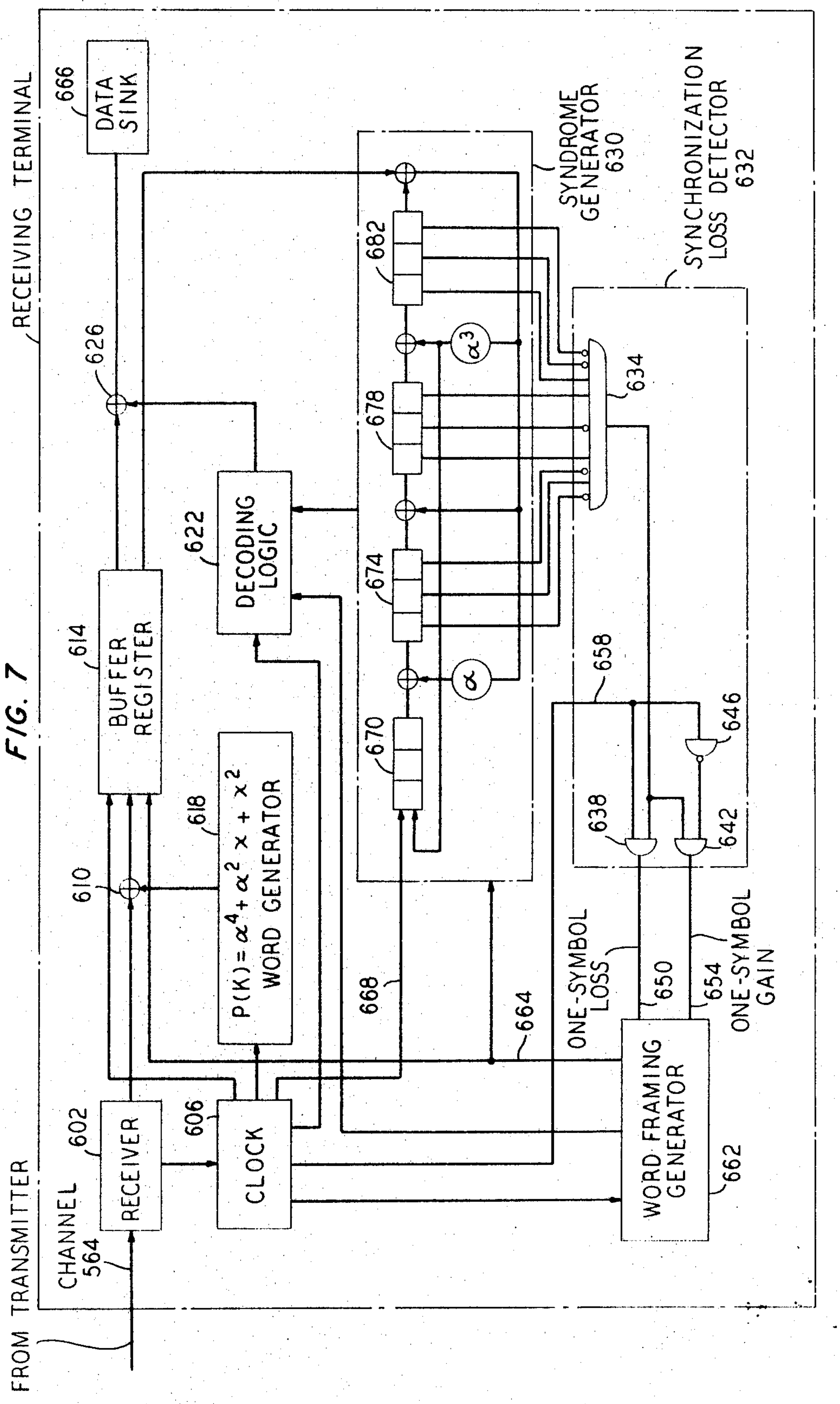

FIGS. 6 and 7 show a data system for utilizing the (7, 3) Reed-Solomon code for one-symbol synchronization slippage recovery as discussed above. For implementing this code as noted earlier, each of the eight alphabetic symbols 0, $\alpha^0$, $\alpha^1$ . . . $\alpha^6$ are represented by a three-bit sequence as shown in FIG. 3. (Of course, binary representations other than shown are also possible.)

FIG. 6 illustrates the logic necessary for encoding three-symbol data words into cyclic code words and for adding the polynomial $P(x)=\alpha^4+\alpha^2x+x^2$ to each code word. A three-symbol data word, each symbol in turn consisting of three bits, is applied by a data source 504 to an encoder 512 and specifically to an AND gate 520 and a modulo-2 adder 532. During this applicatiton, a clock 500 applies a "low" signal to an inverter 516 where the signal is inverted to a "high" signal for enabling AND gate 520 to thereby allow the transfer of the data word therethrough to an OR gate 524. The data word is then applied to a modulo-2 adder 526 where it is added to a corresponding portion of the word $P(x)=\alpha^4+\alpha^2x+x^2$ which in this case would consist of the symbols "0." The resultant is applied to a transmitter 560 for transmission over a channel 564 to a receiving terminal. The data word, while being applied to the transmission channel, is also being utilized by the encoder 512 to generate parity symbols. This is accomplished by applying the data word to the modulo-2 adder 532 where each symbol of the data word is added to the contents of a register 558 (whatever those contents are when a particular data symbol is applied) after which the resultant is applied to an AND gate 536. The "inverted" clock signal from the inverter 516 enables the AND 536, thereby allowing transfer of the resultant symbols from the modulo-2 adder 532 to a lead 538. Each resultant symbol is thereby applied to an $\alpha^3$ multiplier 540, to a modulo-2 adder located between register stages 552 and 556, and to an $\alpha$ multiplier 554. The $\alpha^3$ multiplier 540 and the $\alpha$ multiplier 554 multiply each resultant three bit symbol by the symbol $\alpha^3$ and $\alpha$ respectively and then apply the product to the corresponding modulo-2 adders shown in FIG. 6. After the three symbol data word has been applied by the data source 504 to the encoder 512, the contents of the encoder, i.e., the contents of stages 548, 552, 556, and 558 contain respectively four parity symbols which together with the three information symbols comprise a code word.

After the parity symbols have been generated by the encoder 512, the clock 500 applies a "high" signal to the inverter 516 and to an AND gate 528. The inverter 516 inverts the signal to a "low" signal, thereby disabling AND gate 536 and preventing application of any data from the modulo-2 adder 532 to the lead 538. While the "high" signal from the clock is being applied to the AND gate 528, the contents of the encoder (i.e., the check symbols) are shifted via the modulo-2 adder 532 to the AND gate 528. Application of the check symbols and the "high" signal to the AND gate 528 enables the gate therby allowing transfer of the check symbols to the OR gate 524 and then to the modulo-2 adder 526 where they are added to corresponding symbols of the word $P(x)$ received from the $P(x)$ word generator 508. The resultant is applied to the transmitter 560 for transmission via the channel 564 to the receiving terminal. In this manner, three symbol data words are encoded into seven symbol code words, modified by the addition of the word $P(x)$, and transmitted over the channel 564.

FIG. 7 shows receiving terminal apparatus for providing synchronization recovery with the (7, 3) Reed-Solomon code. Illustratively, a receiver 602 receives each transmitted word from the channel 564 and applies the word to a modulo-2 adder 610 where the word is added to the word $P(x)$ applied from a $P(x)$ word generator 618. (In the general case, the word $P(x)$ would be subtracted from the received word, but in this example with $p=2$, addition may be used since modulo-2 addition is the same as modulo-2 subtraction.) The resultant word is applied to a buffer register 614. The buffer register 614 then applies the word to a syndrome generator 630 which comprises the same storage register and feedback configuration as the encoder 512 of FIG. 6. From this word, the syndrome generator 630 generates a syndrome which it stores in storage registers 670, 674, 678, and 682.

Earlier it was shown that the one-symbol synchronization loss pattern for the (7, 3) Reed-Solomon code was $\delta_4+\alpha x+\alpha^6x^2+x^3$. (Equation 4). If this pattern is generated by the syndrome generator 630, a gate 634 of a synchronization loss detector 632 is enabled. That is, if the symbol $\alpha=010$ is in stage 674, the symbol $\alpha^6=101$ in stage 678, and the symbol $\alpha^0=100$ in stage 682, then the gate 634 is enabled thereby indicating that the one-symbol synchronization loss pattern has been detected. Enablement of gate 634 in conjunction with a "high" condition on lead 658 from the clock 606 enables an AND gate 638, thereby signaling a word framing generator 662 that a one-symbol synchronizatiton loss has occurred.

To test for a one-symbol synchronization gain (following the above test for synchronization loss), the clock 606 applies a shift pulse via lead 668 to the syndrome generator 630 which causes a single symbol (or a three-bit) shift of the contents of the four register stages of the syndrome generator. This shift is equivalent to multiplying the contents of the syndrome generator by $x$. At the completion of this shift, the lead 658 is made low. It was previously shown that the one-symbol synchronization gain pattern could be converted to the one-symbol loss pattern by multiplying the gain pattern by $x$. If therefore a one-symbol synchronization gain has occurred, the gain pattern will be present in the syndrome generator before the one-symbol shift and will be converted to the one-symbol loss pattern as a result of the shift. Presence of this pattern in the syndrome generator 630 as discussed above causes the enablement of gate 634. Enablement of gate 634 in conjunction with the "low" condition on lead 658 which is inverted to a "high" condition by an inverter gate 646, causes the enablement of an AND gate 642. When AND gate 642 is enabled, a signal is applied via lead 654 to the word framing generator 662, indicating to the word framing generator that a one-symbol synchronization gain has occurred.

The word framing generator 662 may be of a type similar to that shown in the aforecited S. Y. Tong parent application. In its normal operation, the word framing generator 662 counts seven symbol times before resetting to begin counting again. Each count is in response to a pulse from the clock 606 which is driven by the received data. During the first three symbol counts, lead 664 is in the "high" condition (or alternatively, the "low" condition). When the count reaches four, the lead 664 is made "low" (or alternatively, "high") and remains "low" for the next four symbol counts. The condition of lead 664 indicates to the buffer register 614 and the syndrome generator 630 which symbols of a received code word are data symbols and which symbols are parity symbols. That is, when the lead 664 is in the "high" condition, the symbols being received or operated on by the buffer register and syndrome generator are to be considered data symbols; when in the "low" condition, the symbols are to be considered parity symbols. In response to a signal via lead 650 that a one-symbol synchronization loss has occurred, the word framing generator 662 resets to begin counting again after only six counts rather than the usual seven. In this way, word synchronization of the system is advanced one symbol by temporarily shortening the word framing period, specifically, the period during which parity symbols are being counted or being operated upon. For a one-symbol synchronization gain, a similar process is followed except that the word framing generator 662 counts an extra symbol time rather than one less symbol time, such that synchronization is backset one symbol.

The syndromes generated by the syndrome generator 630 are also utilized by decoding logic 622 to determine the presence and value of additive errors in the received word. If such errors are present, they are corrected by the simultaneous application of the received words from the buffer register 641 and "correcting" symbols from the decoding logic 622 to a modulo-2 adder 626 where any erroneous symbols in the received words are converted to their correct version. The corrected words are then applied to a data sink 666.

CYCLIC CODES USED TO CORRECT $$<t=\left[\frac{d-1}{2}\right]$$

ERRORS

A full-length cyclic code which corrects $t$ errors and has a minimum distance $d_m$ between code words can be utilized for synchronization recovery of at least $$r<\frac{n-k-t+[t/2]}{2+[t/2]}\text{ symbols}$$

provided $2t\leq d_m-r-2$ where:

$n$=code word length
$k$=number of information symbols/code word
$[t/2]$=the largest integer $\leq t/2$ If the full error-correcting ability of the code is utilized as in the embodiment just previously discussed, then synchronization recovery is not possible by this scheme since $d_m=2t+1$ for such codes and the inequality $2t\leq d_m-r-2$ or $2t\leq(2t+1)-r-2$ is not satisfied for $r$ positive. This scheme would thus ordinarily be used with those *detecting* algorithms which do not utilize the full error-correcting capability of the code.

For synchronization slippage detection, the word $P(x)$ must be selected in such a way that for any sync slippage $\leq r$, the error patterns generated in the decoding process are different from all correctable *additive* error patterns. A general expression of P(x) for providing sync recovery for a code defined as above is $$P(X)=\sum_{\sigma=\sigma_0}^{[t/2]} a_\sigma x^{\sigma(r+1)-\sigma_0}+bx^{n-1}$$

where $\sigma_0=1+2[t/2]-1$, $a_\sigma$ and $b$ are characters of the coding alphabet $\neq 0$, and $\sigma=\sigma_0, 1, \ldots [t/2]$.

Addition of P(x) at the transmitting terminal and subtraction thereof at the receiving terminal can be accomplished as described for previous schemes. The strategy for correcting sync slippage is simply to (1) determine if more than $t$ errors are indicated by the error pattern obtained upon decoding. If so, (2) process the syndrome from which the error pattern was obtained in accordance with the procedure to be described below to determine if a synchronization slippage has occurred. If a syndrome loss or gain is detected, apply either a "backset" or "advance" pulse, whichever is appropriate, to the word framing generator.

Synchronization losses or gains of $s\leq r$ symbols are determined as follows:

(1) Synchronization *loss* of $s$ symbols—

Generate the syndrome of the receiving word and then obtain the remainder $r_s(x)$ of $$\frac{(x^s-1)P(x)}{G(x)}$$

where G(x) is the generator polynominal of the code. An $s$-symbol loss is indicated if the higher order $n-k-s$ terms of the syndrome are the same as the $n-k-s$ higher order terms of $r(x)$.

(2) Synchronization *gain* of $s$ symbol—

Generate the syndrome of the received word and then multiply the syndrome by $x^1$ and then obtain the remainder $r_i(x)$ of $$\frac{(x^i-1)P(x)}{G(x)}$$

An $i$-symbol gain is indicated if the higher $n-k-i$ terms of the syndrome are the same as the $n-k-i$ higher order terms of $r_i(x)$ where $1\leq i\leq r$.

SHORTENED CYCLIC CODES WITH $t>3$ ERROR CORRECTING ABILITY

If the $i$ leading information symbols of an $(l, f)$ cyclic code are made identically zero and then omitted from the code word, the resulting code is called an $(l-i, f-i)$ shortened cyclic code. The symbol positions omitted from the code word can be called virtual symbol positions. The error correcting ability of any cyclic code is at least as great as that of the cyclic code from which it was derived but the information transmission rate of a shortened code is somewhat reduced from the cyclic code.

A cyclic code which corrects $t\geq 2r+2$ errors, $r>0$, and is shortened $\geq 3r+1$ symbols, can be utilized to detect a synchronization loss or gain of specifically $\beta\leq r$ symbols. A cyclic code which corrects $t\geq 2r+1$ errors, $r>0$, and is shortened $\geq 2r+1$ symbols can be utilized to detect a synchronization loss if the loss is $\leq r$ symbols and to detect a synchronization gain of specifically $\beta\leq r$ symbols. (Alternatively, the code could be used to detect a synchronization gain of $\leq r$ symbols and a synchronization loss of specific $\beta\leq r$ symbols.) Thus, for the latter code described, synchronization slippage in one direction can be detected, while for the other direction, the specific amount of symbol slippage can be determined, provided that the slippage in either direction is $\leq r$ symbols.

In the first case above, one possible choice of the word P(x) to be added at the transmitting end and subtracted at the receiving end can be represented as $$P(x)=\left\{ax^{n+\left[\frac{3r+1}{2}\right]}\right\} \qquad (5)$$

where $a$ is one of the symbols of the coding alphabet and is not zero, $n$ is the number of symbols in the shortened cyclic code word and $$\left[\frac{3r+1}{2}\right]$$

represents the largest integer less than or equal to $$\frac{3r+1}{2}$$

The notation {*} has been discussed earlier.

The addition of $$\left\{ax^{n+\left[\frac{3r+1}{2}\right]}\right\}$$

to the code word to be transmitted can be accomplished by adding the symbol $a$ to the code word position corresponding to $$x^{n+\left[\frac{3r+1}{2}\right]}$$

at the encoder. However, since the digit corresponding to this position (i.e., the $$n+\left[\frac{3r+1}{2}\right]^{st}$$

position is not actually transmitted, only the syndrome of $$ax^{n+\left[\frac{3r+1}{2}\right]}$$

is added to the encoded word. The syndrome of $$ax^{n+\left[\frac{3r+1}{2}\right]}$$

is the remainder obtained from dividing the polynominal $$ax^{n+\left[\frac{3r+1}{2}\right]}$$

by the code generator polynominal G(x). The decision rule for decoding in this case is as follows:

If the decoder determines that the received symbol corresponding to position $$x^{n+\left[\frac{3r+1}{2}\right]}$$

has a value $a$ and in addition that (1) the symbol corresponding to the position $$x^{n+\left[\frac{3r+1}{2}\right]+\beta}$$

has a value $a$, $0<\beta\leq r$, then it is assumed that the system has lost $\beta$ symbols, or that (2) the symbol corresponding to the position $$x^{n+\left[\frac{3r+1}{2}\right]-\beta}$$

has a value $a$ where again $0<\beta\leq r$, then it is assumed that the system has gained $\beta$ symbols.

In the case of a cyclic code shortened by $\geq 2r+1$ symbols with $t\geq 2r+1$ error-correcting ability, a possible choice of P(x) is $\{ax^n\}$ where again, $n$ is the number of symbols in the shortened cyclic code word and $a$ is one of the symbols of the code alphabet $\neq 0$. The decision rule for decoding in this case is:

(1) If the decoder determines that the symbol corresponding to $x^n$ of the received word has an error value equal to $a$, and no symbols corresponding to the position $x^k$ are in error, where $n<k<l-1$, where $l$ is the length of the cyclic code from which the shortened code is derived, then it is assumed that the system has gained a few symbols in synchronization. By backsetting the word framing, the system will regain synchronization in at most $r$ word times (i.e., the time to transmit $r$ words).

(2) If the decoder determines that the symbol corresponding to $x^{n+\beta}$ of the received word has an error value equal to $a$, and $1\leq\beta\leq r$, then it is assumed that the system has lost specifically $\beta$ symbols. In this case, synchronization is regained in either a step-by-step fashion as in (1) above, or by a one-step correction.

Other values of $P(x)$ could also be utilized. For instance, if $P(x)=\{ax^{l-1}\}$ then a decision rule which provides a one-step synchronization gain correction rather than a one-step synchronization loss correction is readily apparent.

It will be noted from the decision rules, that a synchronization slippage is indicated when the decoder determines that symbols not transmitted (because the code is shortened) have certain error values. The fact that symbols not transmitted are determined to be in error results because the detecting of shortened cyclic codes is carried out as if the received code word is not shortened, i.e., as if hte number of "0's" by which the code was originally shortened were added to the received code word before decoding. The adding or appending of "0's" on the received code word may not actually be done, but something equivalent is. Thus, if it is determined upon decoding that symbols not transmitted have certain specific error values, then according to the given decision rules and criteria for decoding, this indicates that a sync slippage has occured.

SHORTENED CYCLIC CODE WITH $t \geq 2$ ERROR-CORRECTING ABILITY

A cyclic code which is shortened by $\geq 2r+1$ symbols, has $t \geq 2$ error-correcting ability and has $r$ "0's" appended to each end of the code word can be utilized to correct specifically a $\beta \leq r$ symbol synchronization gain or loss.

The encoding methods discussed earlier may be employed to implement the above scheme, except that a provision for inserting "0's" between code words is required. If the alphabetic character of the coding alphabet which has a value "0" is represented by the absence of a pulse, the appending of "0's" may be accomplished simply by timing the appropriate number of symbol times between the outpulsing of code words. The symbol times then would, of course, represent the "0's."

Any $P(x)=\{ax^{l-i}\}$ where $1 \leq i \leq l-2r-n$, $l$ is the length of the cyclic code from which the shortened cyclic code is derived, and $a$ is a character of the coding alphabet $\neq 0$, can be used for this sync recovery scheme. As in the other cases, $P(x)$ is added modulo $p$ to the code word to be transmitted.

At the receiving terminal, $x^r P(x)$ is subtracted from each received code word. The polynomial $x^r(P(x)$ rather than $P(x)$ is subtracted at the receiving terminal to account for the $r$ "0's" appended to each end of each code word transmitted (i.e., so that the symbols of $P(x)$ will be subtracted from the modified code word and not from any of the appended "0's"). The syndrome of the resulting word is then obtained and processed to determine the error pattern of the received word. To this pattern the following synchronization correcting rules are applied:

(1) If the symbol in the position $ax^{l-1}$ of the received word has an error value $a$, then it is presumed that a sync slippage has occurred.

(2) If, in addition, the only other error symbol is in the position corresponding to $x^{l+m-1}$, $|m| \leq r$, and has a value $a$, while the actual symbol of that position is either not transmitted or has a value "0," then it is presumed that an $m$-symbol loss has occurred if $m$ is positive or than an $m$-symbol gain has occurred if $m$ is negative.

Implementation of the above scheme may be carried out in a fashion similar to the schemes discussed earlier.

SHORTENED CYCLIC CODE WITH $t \geq 1$ ERROR CORRECTING ABILITY

For a $t \geq 1$ error-correcting cyclic code whose generator polynominal satisfies the condition that $G(1)-G(0)=0$ and which has been shortened by two symbols and has a "0" appended to each end of the encoded messages, it is possible to detect a one-symbol synchronization loss or gain. The appropriate word to be added at the transmitting terminal and subtracted at the receiving terminal is either $$P(x)=\left\{\frac{ax^{l-1}}{x-1}\right\} \text{ or } P(x)=\frac{ax^{l-1}}{x-1}$$

where $l$, as before, is the natural length of the cyclic code from which the shortened code is derived.

Figure 2:
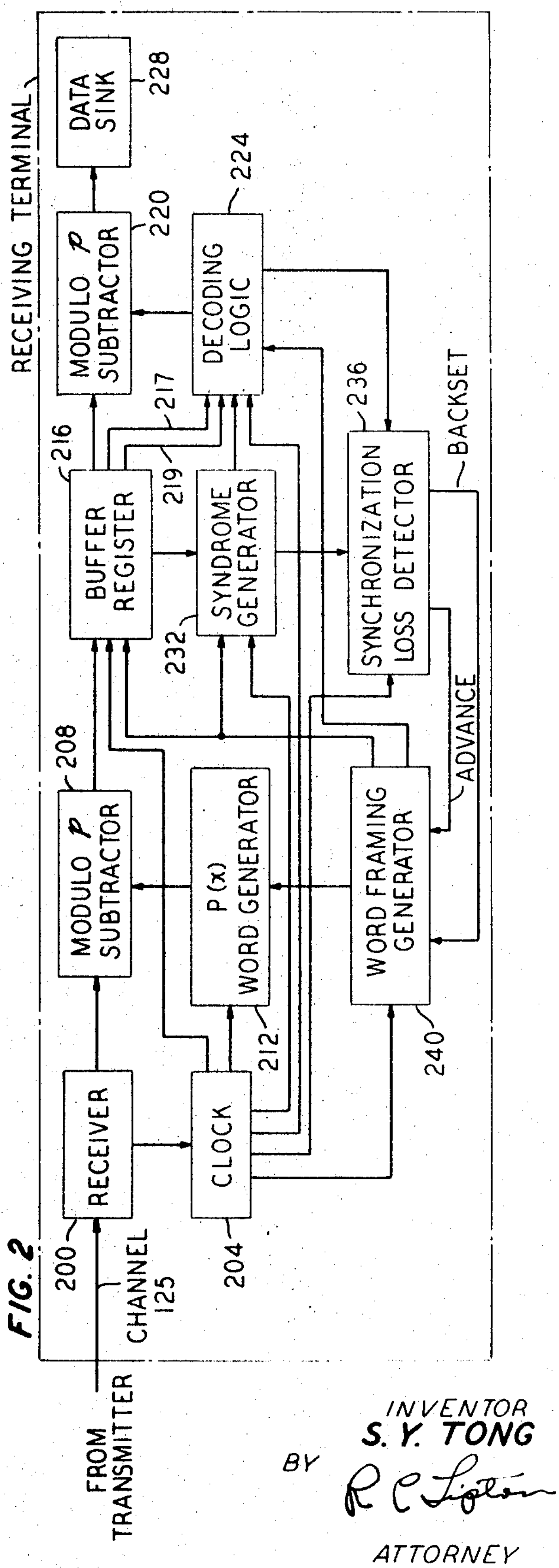

The appending of "0's" can be accomplished by timing for two symbol times subsequent to the outpulsing of each encoded message. Addition of $P(x)$ is done by generating and adding the word corresponding to the syndrome of $$\frac{ax^{l-1}}{x-1} \text{ or } \frac{ax^{l-1}}{x-1}$$

itself to each encoded message. At the receiving terminal, $P(x)$ is subtracted from the received message. If at the receiving terminal, it is determined that the symbol in the position $x^0$ of the received word has an error value $a$ and that the actual value of this symbol is "0," then a one-symbol loss is indicated. If it is determined that the symbol corresponding to the position $x^{l-1}$ has an error value $a$ and that the actual value of this symbol is "0" then a symbol gain is presumed. The two leads 217 and 219 from the buffer register 216 to the decoding logic 224 shown in FIG. 2 provide the information concerning the values of the symbols in the positions $x^0$ and $x^{l-1}$.

It is emphasized that although specific codes were utilized for the purpose of illustrating the various applications of the present invention, the principles of the present invention are clearly applicable to any code meeting the requirements set forth.

Five specific illustrative embodiments of the invention were described. Although each embodiment differs from every other in some way, they all require that the data words to be transmitted be modified by the addition of a preselected word which includes an alphabetic symbol $a \neq 0$. After receipt of the modified word, the preselected word is substracted therefrom and the resulting word is processed according to a particular decoding strategy. This decoding process reveals whether a synchronization loss or gain has occurred and then steps are taken to recover synchronization.

It is noted that detailed circuit configurations for the units 508, 540, 544, 560, 602, 614, 618, and 622 shown in FIGS. 6 and 7 have not been given herein because their arrangements are considered to be clearly within the skill of the art. In view of FIGS. 1 and 2 showing a generalized illustrative synchronization recovery system, and FIGS. 6 and 7 showing a detailed specific embodiment of a synchronization recovery system utilizing the principles of the present invention, further detailed circuit configurations illustrating other specific embodiments of the present invention described herein are deemed unnecessary.

Finally, it is understood that the above-described arrangements are only illustrative of the application of the principles of the present invention. Numerous other modifications and alternative arrangements may be devised by those skilled in the art without departing from the spirit and scope of the invention.

What is claimed is:

1. In combination in a data processing system comprising a source of information, means for encoding said information into a cyclic code $C_1$ having minimum distance $d_1$ and generated by a generator polynomial $G_1(x)$, said code being associated with another cyclic code $C_2$ having minimum distance $d_2$ and generated by a generator polynomial $G_2(x)$ in which $G_1(x)=G_2(x)R(x)$, where $R(1) \neq 0$ and $$d_2 > \left[\frac{d_1+1}{2}\right]$$

means for modifying the code words of code $C_1$ by addition (modulo the number of symbols in the $C_1$ code alphabet) of a preselected word $$P(x)=\left\{\frac{k(x)-k(1)}{x-1}\right\}$$

where $k(x)$ is a code word of $C_2$ but not of $C_1$, and means for applying said modified code words to one end of a communication channel.

2. A combination as in claim 1 further including means connected to the other end of said channel for generating said same fixed sequence $P(x)$ or an equivalent sequence and for subtracting said sequence from each received code word.

3. A combination as in claim 2 further including means for generating the syndrome of each word obtained from said subtraction, and means responsive to the generation of the syndrome $\{k(x)+\delta\}$ where $\delta$ represents any symbol of the coding alphabet for advancing the word framing of said data system and responsive to the generation of the syndrome $\{-x^{n-1}[k(x)+\delta]\}$ where $n$ is the code word length for backsetting word framing of said data system.

4. A combination as in claim 3 wherein said code $C_1$ is a Reed-Solomon (7, 3) code having an eight symbol alphabet 0, $\alpha^0$, $\alpha$, $\alpha^2$ . . . $\alpha^6$ and generated by the generator polynomial $G_1(x)=\alpha^3-\alpha x+x^2-\alpha^3x^3+x^4$, wherein said code $C_2$ is generated by the generator polynomial $$G_2(x)=\alpha^6+\alpha x-\alpha^6x^2+x^3$$

and wherein said preselected word $P(x)=\alpha^4+\alpha^2x+x^2$.

5. A combination as in claim 4 wherein said syndrome generating means comprises means for generating the syndrome $\delta+\alpha x+\alpha^6x^2+x^3$ if a one-symbol synchronization loss occurs and for generating the syndrome $$\delta x^{-1}+\alpha+\alpha^6x+x^2$$

if a one-symbol synchronization gain occurs, where $\delta$ represents any symbol of the coding alphabet.

6. In combination in a data processing system comprising a source of information, means for encoding said information into a $q$-nary cyclic code having $t$-error correcting ability and minimum distance $d_m$ between code words, where $q$ represents the number of symbols in the code alphabet and is $\geq 3$, means for modifying said code words by adition of a preselected word $$P(x)=\sum_{\sigma=\sigma_0}^{[t/2]} a_\sigma x^\sigma(r+1)-\sigma_{0+bx}n-1$$

where $n$ is the code word length, $[t/2]$ is the largest integer just less than or equal to $t/2$, $a_\sigma$ and $b$ represents symbols of the coding alphabet $\neq 0$, $2t \leq d_m-r-2$, $$\sigma_0=1+2[t/2]-t$$

and $$r<\frac{n-k-t+[t/2]}{2+[t/2]}$$

symbols, and means for applying said modified code words to one end of a communication channel.

7. A combination as in claim 6 further including means connected to the other end of said channel for generating said sequence $P(x)$ and for subtracting said sequence from each received code word.

8. A combination as in claim 7 further including means for generating the syndrome of each word obtained from said subtraction, means for generating an error pattern word from each of said syndromes, means for processing said error pattern word to determine if the received word has $t$ or more errors and for signaling a pocessing means if said condition exists, processing means for processing said syndrome from which said error pattern word was obtained to determine the synchronization condition of said data system, and means for backsetting word framing of said data system if it is determined that said syndrome resulted from a synchronization gain and for advancing word framing of said data system if it is determined that said syndrome resulted from a synchronization loss.

9. In combination, in a data processing system comprising a source of information and means for encoding said information into code words comprising a $q$-nary error-correcting cyclic code, where $q=p^n\geq 3$ represents the number of symbols in a coding alphabet, $p$ represents a prime number, and $n$ represents a positive number, means for modifying each of said code words to be transmitted by addition modulo-$p$ of a fixed predetermined sequence which includes a symbol of the coding alphabet $a\neq 0$, means for applying said modified code words to one end of a communication channel, means connected to the other end of said channel for subtracting a fixed predetermined sequence which includes said symbol $a$ from each received code word, means for processing each word obtained from said subtraction to obtain an error pattern word, means for processing said error pattern words and for automatically correcting certain synchronization losses of said data processing system when said symbol $a$ is detected in certain specific positions of said error pattern words.

10. A combination as in claim 9 in which said processing and correcting means comprises means for applying the words obtained from said subtraction to a buffer register storing means for temporarily storing said words and then to a syndrome generating means for generating a syndrome from each of said words, and decoding logic means connected to said generating means for generating an error pattern word from each of said syndromes.

11. A combination as in claim 10 including a synchronization loss detection means for processing said error pattern words in accordance with a predetermined decoding strategy to determine whether a synchronization gain or loss has occurred in said data processing system.

12. A combination as in claim 11 further including a word framing generator means responsive to said synchronization loss detection means for advancing or backsetting word framing of said buffer register storing means and said syndrome generating means to recover synchronization of said system.

13. A combination as in claim 12 in which said encoding means comprises means for encoding information into a cyclic code shortened by at least $3r+1$ symbols and having a $t\geq 2r+2$ symbol error-correcting ability, where $r>0$, means for modifying each of said code words by addition modulo-$p$ of a preselected sequence $$P(x)=\left\{ax^{n+\left[\frac{3r+1}{2}\right]}\right\}$$

where $n$ is the length of the shortened code and $$\left[\frac{3r+1}{2}\right]$$

represents the largest integer $$\leq\frac{3r+1}{2}$$

14. A combination as in claim 13 in which said subtracting means includes means for generating the same said fixed sequence $P(x)$ and for subtracting said sequence from each received code word.

15. A combination as in claim 14 in which said synchronization loss detecting means comprises means for processing said error patterns to determine a first condition, whether the symbol corresponding to the position $$x^{n+\left[\frac{3r+1}{2}\right]}$$

has an error value $a$ and in addition to determine a second condition, whether the symbol corresponding to the position $$x^{n+\left[\frac{3r+1}{2}\right]+\beta}$$

has an error value $a$, $0<\beta<r$, and a third condition, whether the symbol corresponding to the position $$x^{n+\left[\frac{3r+1}{2}\right]-\beta}$$

has an error value $a$.

16. A combination as in claim 15 in which said word framing generator means comprises means for advancing the word framing of said data system $\beta$ symbols in response to a determination that said first and said second conditions exist and for backsetting the word framing $\beta$ symbols in response to a determination that said first and third conditions exist.

17. A combination as in claim 12 in which said encoding means comprises means for encoding information into a cyclic code shortened by at least $2r+1$ symbols and having a $t\geq 2r+1$ error correcting ability where $r>0$, means for modifying each of said code words by addition modulo $p$ of a preselected sequence $P(x)=\{ax^n\}$ where $n$ is the length of the shortened code.

18. A combination as in claim 17 in which said subtracting means includes means for generating the same said fixed sequence $P(x)$ and for subtracting said sequence from each received code word.

19. A combination as in claim 18 in which said processing and correcting means comprises means for generating the syndrome of each word obtained from said subtraction, means for processing said syndrome to determine a first condition that the symbol corresponding to the position $x^n$ of the received word has an error value of $a$ but that none of the positions corresponding to $x^k$ are in error, $n<k\leq l-1$, where $l$ is the length of the cyclic code from which the shortened code is derived and $n$ is the length of each code word, and to determine a second condition that the symbol corresponding to the position $x^{n+\beta}$, $1\leq\beta\leq r$, has an error value $a$.

20. A combination as in claim 19 in which said word framing generator means comprises means for backsetting the word framing of said data system in response to a determination that said first condition exists and for advancing the word framing $\beta$ symbols in response to a determination that said second condition exists.

21. A combination as in claim 12 in which said encoding means comprises means for encoding said information into a cyclic code shortened by at least $2r+1$ symbols, having a $t\geq 2$ error-correcting ability, and an $r$-symbol synchronization recovery ability, means for modifying each of said code words by addition modulo $p$ of a preselected sequence $P(x)=\{ax^{l-i}\}$, $1\leq i\leq l-2r-n$, where $l$ is the length of the cyclic code from which the shortened code is derived and $n$ is the length of the shortened code, and means for appending $r$ "0's" to each end of said code words by timing $2r$ symbol times between outpulsing of said words.

22. A combination as in claim 21 in which said subtracting means includes means for generating the fixed binary sequence $x^rP(x)$ and for subtracting said sequence from each received word.

23. A combination as in claim 22 in which said synchronization loss detection means comprises means for processing said error pattern words to determine if the symbol corresponding to the position $x^{l-1}$ power of the received word has an error value $a$ and if the only other symbol having an error value $a$ corresponds to the position $x^{l-m-1}|m|\leq r$, and to determine if the symbol corresponding to $x^{l-m-1}$ either was not transmitted because it was a virtual symbol or has the value "0."

24. A combination as in claim 23 in which said word framing generator means comprises means for advancing the word framing of said data system $m$ symbol in response to a determination that $m$ is positive or for backsetting word framing $m$ symbols in response to a determination that $m$ is negative.

25. A combination as in claim 12 in which said encoding means comprises means for encoding said information into a cyclic code which has been shortened by two symbols, has $t\geq 1$ error-correcting ability and whose generator polynomial $G(x)$ satisfies the condition $G(1)-G(0)=0$, means for modifying each of said code words by addition modulo $p$ of a preselected sequence $$P(x)=\frac{ax^{l-1}}{x-1}\text{ or }=\frac{ax^{l-1}}{x-1}$$

where $l$ is the length of the cyclic code from which the shortened code is derived, and means for appending a "0" to each end of said code words by timing two symbol times between outpulsing of said code words.

26. A combination as in claim 25 in which said subtracting means includes means for generating the fixed sequence $xP(x)$ and for subtracting said sequence from each received word.

27. A combination as in claim 26 in which said synchronization loss detection means comprises means for processing said error pattern words to determine the existence of a first condition in which the symbol corresponding to the position $x^0$ of the received word has an error value $a$ and the value of said symbol is "0," and further means for determining from said error pattern word if a second condition exists in which the symbol corresponding to the position $x^{l-1}$ has an error value $a$ and the actual value of the symbol in position $x^{l-1}$ is "0."

28. A combination as in claim 27 in which said word framing generator means comprises means for advancing the word framing of said data system by one symbol in response to a determination that said first condition exists and for backsetting the word framing by one symbol in response to a determination that said second condition exists.

References Cited

UNITED STATES PATENTS

| | | | |
|---|---|---|---|
| 3,336,467 | 8/1967 | Frey | 235—153 |
| 3,389,375 | 6/1968 | Burton | 340—146.1 |
| 3,411,135 | 11/1968 | Watts | 340—146.1 |
| 3,437,995 | 4/1969 | Watts | 340—146.1 |
| 3,466,601 | 9/1969 | Tong | 340—146.1 |

MALCOLM A. MORRISON, Primary Examiner
C. E. ATKINSON, Assistant Examiner

U.S. Cl. X.R.

178—69.5; 179—15